US006878662B2

(12) United States Patent
Murray

(10) Patent No.: US 6,878,662 B2
(45) Date of Patent: Apr. 12, 2005

(54) POLYMERIZATION CATALYST SYSTEM, POLYMERIZATION PROCESS AND POLYMER THEREFROM

(75) Inventor: Rex E. Murray, Cross Lanes, WV (US)

(73) Assignee: Univation Technologies, LLC, Houston, TX (US)

(*) Notice: Subject to any disclaimer, the term of this patent is extended or adjusted under 35 U.S.C. 154(b) by 59 days.

(21) Appl. No.: 10/023,265

(22) Filed: Dec. 18, 2001

(65) Prior Publication Data
US 2002/0086960 A1 Jul. 4, 2002

Related U.S. Application Data
(60) Provisional application No. 60/258,482, filed on Dec. 28, 2000.

(51) Int. Cl.$^7$ ................ C08F 4/60; C08F 4/64; C08F 4/642; C08F 4/74
(52) U.S. Cl. ............ 502/155; 502/117; 502/152; 502/103; 502/156; 502/167; 502/168; 526/161; 526/172
(58) Field of Search ............... 526/161, 172; 502/152, 155, 168, 162, 167

(56) References Cited

U.S. PATENT DOCUMENTS

| 4,508,842 | A | | 4/1985 | Beran et al. ............ 502/112 |
| 4,845,067 | A | | 7/1989 | Kao et al. ............ 502/119 |
| 4,999,327 | A | | 3/1991 | Kao et al. ............ 502/119 |
| 6,150,482 | A | * | 11/2000 | Brookhart et al. ......... 526/161 |
| 6,281,303 | B1 | * | 8/2001 | Lavoie et al. ............ 526/127 |
| 6,562,751 | B2 | * | 5/2003 | Wang et al. ............ 502/155 |
| 2002/0107345 | A1 | * | 8/2002 | Ittel et al. ............ 526/161 |

FOREIGN PATENT DOCUMENTS

| EP | 0 874 005 A1 | 10/1998 |
| EP | 0 896 454 A1 | 1/1999 |
| GB | 1015054 | 12/1965 |
| WO | WO 96/23101 | 8/1996 |
| WO | WO 96/33202 | 10/1996 |
| WO | WO 97/02298 | 1/1997 |
| WO | WO 99/01460 | 1/1999 |

OTHER PUBLICATIONS

"Octahedral Group 4 Metal Complexes That Contain Amine, Amido, and Aminopyridinato Ligands: Synthesis, Structure and Application in α–Olefin Oligo– and Polymerization", Furhmann et al, *Inorg. Chem.* 1996, 35, 6742–6745.

"The Search for New–Generation Olefin Polymerization Catalysts: Life Beyond Metallocenes", Britovsek et al., Angew. Chem. Int. Ed. 1999, 38, 428–447.

* cited by examiner

Primary Examiner—Roberto Rabago
(74) Attorney, Agent, or Firm—Lisa Kimes Jones; Kevin M. Faulkner

(57) ABSTRACT

The invention provides olefin(s) polymerization catalyst compositions that include at least one tridentate ligand coordinated to the transition metal by one datively bonded heteroatom and two anionically bonded heteroatoms.

12 Claims, No Drawings

POLYMERIZATION CATALYST SYSTEM, POLYMERIZATION PROCESS AND POLYMER THEREFROM

CROSS-REFERENCE TO RELATED APPLICATION

The present application claims priority to Provisional U.S. Application U.S. Ser. No. 60/258,482 filed on Dec. 28, 2000, which is herein incorporated by reference.

FIELD OF THE INVENTION

This invention relates to olefin polymerization catalyst systems formed from activators and transition metal compounds having a tridentate ligand, preferably containing pyridine or quinoline moieties, and mixtures thereof, polymerization processes using such catalyst systems and polymer produced therefrom.

DESCRIPTION OF THE RELATED ART

A variety of metallocenes and other single site-like catalysts have been developed to prepare olefin polymers. Metallocenes are organometallic coordination complexes containing one or more pi-bonded moieties (i.e., cyclopentadienyl groups) in association with a metal atom. Catalyst compositions containing metallocenes and other single site-like catalysts are highly useful in the preparation of polyolefins, producing relatively homogeneous copolymers at excellent polymerization rates while allowing one to closely tailor the final properties of the polymer as desired.

The intense commercialization of metallocene polyolefin catalysts has led to widespread interest in the design of other homogeneous catalysts. This field is more than an academic curiosity as new catalysts may provide an easier pathway to currently available products and may also provide product and process opportunities which are beyond the capability of metallocene catalysts. In addition, certain non-cyclopentadienyl type ligands may be more economical due to the relative ease of synthesis of a variety of substituted analogs.

Recently, work relating to certain nitrogen-containing, single site-like catalyst precursors has been published. WO 96/23101, WO 97/02298, WO 96/33202 and Furhmann et al, Inorg. Chem. 35:6742–6745 (1996) all disclose nitrogen containing single site like catalyst systems.

U.S. Ser. No. 09/103,620, now U.S. Pat. No. 6,103,657 published as WO 99/01460 on Jan. 14, 1999, discloses the use of transition metal compounds comprising bidentate ligands containing pyridine or quinoline moieties and mixtures thereof with activators to polymerize olefins. In particular [[1-(2-Pyridal)N-1-Methylethyl]-[1-N-2,6-Diisopropylphenyl Amido]][2-Methyl-1-Phenyl-2-Propoxy] Zirconium Dibenzyl is combined with modified methyl alumoxane in the gas phase to produce ehtylene hexene polymers.

For US purposes the following references are mentioned: U.S. Pat. No. 4,845,067; U.S. Pat. No. 4,999,327; U.S. Pat. No. 4,508,842; and UK 1015054.

SUMMARY OF THE INVENTION

This invention relates to olefin polymerization catalyst that form upon the addition of an activator composition to an transition metal catalyst precursor compound that carries at least one tridentate ligand coordinated to the transition metal by one datively bonded heteroatom and two anionically bonded heteroatoms.

DETAILED DESCRIPTION OF THE INVENTION

This invention relates to olefin polymerization catalyst system comprising at least one activator and at least one transition metal catalysts based on tridentate ligands. In one embodiment, the invention provides a polymerization catalyst including a Group 3 to 12 transition metal or a Group 13 or 14 main group metal, wherein the metal is coordinated to a dianionic tridentate ligand.

In another embodiment, the dianionic tridentate ligand includes a Group 15 element, preferably nitrogen, in a negative electronic state, a Group 16 atom, preferably oxygen, in a negative electronic state, and a Group 15 element, preferably nitrogen, in a neutral electronic state.

Preferably, the metal is a Group 3 (including lanthanides), 4, 5, or 6 metal, more preferably a Group 4 metal, and most preferably zirconium, or hafnium, and the dianionic tridentate ligand is of one of the following formulae:

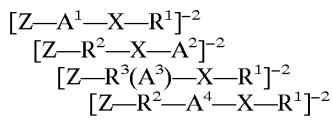

wherein:

X is in its negative electronic state and is a Group 15 element, preferably nitrogen or phosphorus, and more preferably nitrogen.

Z is in its negative electronic state and is a Group 16 element, preferably oxygen or sulfur, and more preferably oxygen.

$R^1$ is a group that may be halogen substituted and is an alkyl, cycloalkyl, heteroalkyl, heterocycloalkyl, aryl, heteroaryl, alkylaryl, or arylalkyl radical and may have some carbon atom positions substituted with other Group 14 atoms. Preferably, $R^1$ is a $C_1$ to $C_{20}$ hydrocarbyl or heteroatom containing hydrocarbyl group, preferably a $C_2$ to $C_{20}$ alkyl, aryl or arylalkyl group, more preferably a cyclic $C_5$ to $C_{20}$ alkyl group, even more preferably a $C_9$ to $C_{12}$ alkyl substituted aryl group, such as 2,6-diisopropyl phenyl and 2,4,6 trimethyl phenyl.

$R^2$ is a group that may be halogen substituted and is an alkylene, cycloalkylene, heteroalkylene, heterocycloalkylene, arylene, heteroarylene, alkylaryl, or arylalkyl diradical and may have some carbon atom positions substituted with other Group 14 atoms, preferably, $R^2$ is a $C_1$ to $C_{20}$ hydrocarbyl or heteroatom containing hydrocarbyl group, preferably a $C_6$ to $C_{20}$ alkylene, arylene, alkylaryl, or arylalkyl diradical.

$R^3$ is a group that may be halogen substituted and is an alkanetriyl cycloalkanetriyl or an aryltriyl triradical and may have some carbon atom positions substituted with other Group 14 atoms, preferably, $R^3$ is a $C_1$ to $C_{20}$ hydrocarbyl or heteroatom containing hydrocarbyl group, more preferably a $C_3$ to $C_6$ alkanetriyl triradical.

$A^1$ through $A^4$ are linking structures of the following formula:

for $A^1$

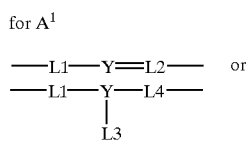

-continued for $A^2$

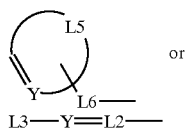

for $A^3$

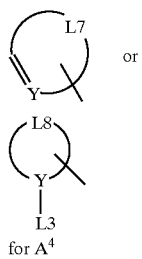

for $A^4$

wherein:

Y is in its neutral electronic state and is a Group 15 element, preferably nitrogen or phosphorus, and more preferably nitrogen.

$L^1$ through $L^9$ may contain other heteroatoms in addition to the X and Z already in the dianion, $L^3$ is hydrogen, or an alkyl, aryl, alkylaryl, or arylalkyl radical that may have some carbon atom positions substituted with other Group 14 atoms, preferably, $L^3$ is a $C_1$ to $C_{20}$ alkyl, cycloalkyl, heteroalkyl, heterocycloalkyl, aryl, heteroaryl, cycloalkyl, alkylaryl, or arylalkyl radical.

$L^1$, $L^4$ and $L^6$ are each independently an alkylene, arylene, alkylaryl, or arylalkyl diradical that may have some carbon atom positions substituted with other Group 14 atoms. Preferably, $L^1$, $L^4$ and $L^6$ are a $C_1$ to $C_{12}$ alkylene, heteroalkylene, cycloalkylene, heterocycloalkylene, arylene, heteroarylene, alkylaryl, or arylalkyl.

$L^2$ and $L^8$ are an alkanetriyl triradical. Preferably, $L^2$ is a $C_2$ to $C_{12}$ alkanetriyl group and $L^8$ is a $C_1$ to $C_{12}$ alkanetriy or heteroalkanetriyl group.

$L^5$ and $L^7$ are an alkanetetrayl tetraradical that may contain sites of unsaturation. Preferably, $L^5$ and $L^7$ are a $C_1$ to $C_7$ hydrocarbyl or heterohydrocarbyl group, preferably an alkanetetrayl tetra radical.

$L^9$ is an alkanepentayl pentaradical that may contain sites of unsaturation, and the tridentate ligand coordinates to the metal through its X, Y and Z group 15 an 16 atoms. Preferably, $L^9$ is a $C_1$ to $C_{20}$ hydrocarbyl or heterohydrocarbyl group, preferably a $C_1$ to $C_{20}$ alkanetpentayl pentaradical.

The Activator Composition

The activator may be any known catalyst activator and in one embodiment is an alkyl aluminum, an alumoxane, a modified alumoxane, a polyalumoxane, a non-coordinating anion, a Lewis acid, a borane or a mixture thereof.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253 and 5,731,451 and European publications EP-A-0 561 476, EP-B1-0 279 586 and EP-A-0 594-218, and PCT publication WO 94/10180, all of which are herein fully incorporated by reference. Methyl alumoxane, modified methylalumoxane, trisobutyl alumoxane, and polymethylalumoxane are preferred activators.

Ionizing compounds (non-coordinating anions) may contain an active proton, or some other cation associated with but not coordinated to, or only loosely coordinated to, the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206, 197, 5,241,025, 5,387,568, 5,384,299 and 5,502,124 and U.S. patent application Ser. No. 08/285,380, filed Aug. 3, 1994, now abandoned all of which are herein fully incorporated by reference. Other activators include those described in PCT publication WO 98/07515 such as tris (2, 2', 2"-nonafluorobiphenyl) fluoroaluminate, which is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activators for the purposes of this invention.

In a preferred embodiment, the activator is selected from the following: tris(2,2',2"-nonafluorobiphenyl) fluoroaluminate, alumoxane, triphenyl boron, triethyl boron, tri-n-butyl ammonium tetraethylborate, triaryl borane, tri(n-butyl)ammonium tetrakis(pentafluorophenyl)boron or a trisperfluorophenyl boron, or diehtylaluminum chloride.

The Tridentate Ligand Generating Compound

This invention relates to olefin polymerization catalyst that form upon the combination of an activator composition with an organo transition metal catalyst precursor compound that carries at least one tridentate ligand coordinated to the transition metal by one datively bonded heteroatom and two anionically bonded heteroatoms one of which is an oxygen atom that is bonded to a carbon atom. The transition metal catalyst precursor compound is obtained by reacting a transition metal compound that carries monovalent ligands with a compound which preferably is represented by one of the following formulas:

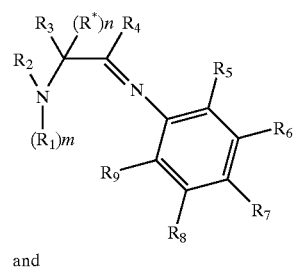

(I)

and

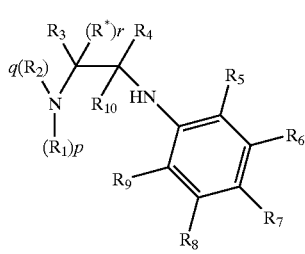

(II)

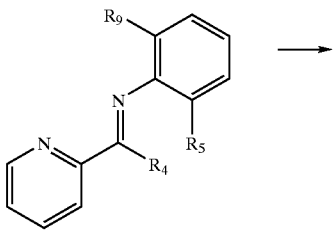

wherein; $R_2$ and $R_3$ are hydrocarbyl radicals or substituted hydrocarbyl radicals, $R_5$–$R_8$ are each, independently, hydrogen, a hydrocarbyl radical or a substituted hydrocarbyl radical; one of $R_1$, $R_2$, $R_3$, $R_4$, or $R_9$ is a radical that contains a Group 16 atom, preferably an oxygen based functional group, and R* is a hydrocarbyl radical or substituted hydrocarbyl radical when $R_1$ is a radical that contains a Group 16 atom, preferably an oxygen based functional group, otherwise $R_1$, $R_2$, $R_3$, $R_4$, $R_9$ and R* are each, independently, hydrogen, a hydrocarbyl radical or a substituted hydrocarbyl radical; any two adjacent groups of $R_5$ to $R_9$ may be joined together to form ring structures; and for formula (I) m and n are values of 0 or 1, and when m is 0 and n is 0 $R_2$ and $R_3$ may be joined together to form an aromatic ring structure, and when n is 0 and m is 1 $R_2$ and $R_3$ may be joined together to form an ring structure and when $R_2$ and $R_3$ are joined together to form an ring then one of $R_4$ or $R_9$ is a radical that contains a Group 16 atom, preferably an oxygen based functional group; for formula (II) $R_1$ through $R_9$ and R* are as explained above and $R_{10}$ is hydrogen, a hydrocarbyl radical or a substituted hydrocarbyl radical; and p, q and r are values of 0 or 1 wherein p is 0 only when q is 1 and r is 0. Compounds wherein nitrogen in the above formula is substituted for by another Group 15 atom are also contemplated.

One preferred class of tridentate ligand generating compounds is of the following formula:

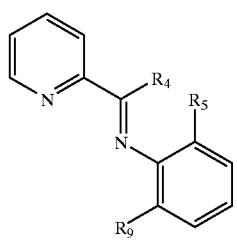

(III)

wherein $R_4$ is a radical that contains an oxygen based functional group such as an alcohol, an aldehyde, a ketone, or an epoxide and $R_5$ and $R_9$ are alkyl radicals such as isopropyl. The above formula (III) also represents another preferred class of tridentate ligand generating compounds wherein the $R_9$ radical contains an oxygen based functional group such as an alcohol, an aldehyde, a ketone, an epoxide and $R_4$ and $R_5$ are alkyl radicals. The above class of tridentate ligand generating compounds, when reacted with a transition metal compound i.e., $MQ_4$, wherein M is a transition metal) that has hydrocarbyl ligands (Q) that are displaced from coordination with the transition metal, will in turn react with the displaced hydrocarbyl ligands where by they add to the tridentate ligand structure in the transition metal catalyst precursor compound that is formed. This is illustrated as follows:

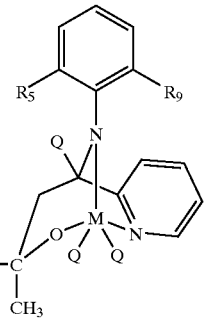

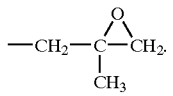

wherein $R_4$ is (one of four isomers is illustrated)

Another preferred class of tridentate ligand generating compounds is of the following formula:

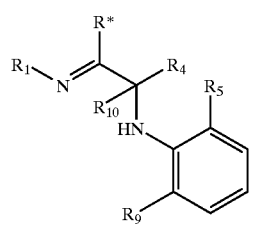

(IV)

wherein $R_1$ is a radical that contains an oxygen based functional group such as an alcohol, an aldehyde, a ketone, an epoxide and R*, $R_4$, $R_5$, $R_9$, and $R_{10}$ are hydrocarbyl radicals. This class of tridentate ligand generating compounds, when reacted with a transition metal compound that has hydrocarbyl ligands (Q) that are displaced from coordination with the transition metal, will not in turn react with the displaced hydrocarbyl ligands other to neutralize the displaced hydrocarbyl ligand to their corresponding hydrocarbon by-product.

Another preferred class of tridentate ligand generating compounds is of the following formula:

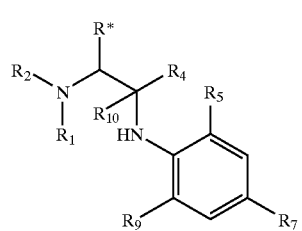

(V)

wherein $R_1$ is a radical that contains an oxygen based functional group such as an alcohol, an aldehyde, an epoxide and R*, $R_2$, $R_4$, $R_5$, $R_7$, $R_9$, and $R_{10}$ are hydrocarbyl radicals. This class of tridentate ligand generating compounds when reacted with a transition metal compound that has hydrocarbyl ligands (Q) that are displaced from coordination with the transition metal will not in turn react with the displaced hydrocarbyl ligands other to neutralize the displaced hydrocarbyl ligand to their corresponding hydrocarbon by-product.

In the above discussed compounds the R group ($R_1$, $R_4$ or $R_9$) which is a radical that contains an oxygen based functional group should be of such atomic length to the point of its site of the oxygen functional group so as to form a five to eight, preferably a five to seven, member ring once the oxygen atom thereof bonds to the transition metal.

The Transition Metal Compound

The catalyst precursor is made by reacting a transition metal compound with a tridentate ligand generating tri-heteroatom compound. The catalyst precursor comprises the reaction product of an transition metal compound and a tridentate ligand generating tri-heteroatom compound as described above.

The metal of the transition metal compound may be selected from Group 3 to 13 elements and Lanthanide series elements. Preferably, the metal is a Group 4 element. More preferably the metal is zirconium.

The transition metal compound for example may be a metal hydrocarbyl such as a metal alkyl, metal aryl, or metal arylalkyl. Metal silylalkyls, metal amides, or metal phosphides may also be used. Preferably, the transition metal compound is a zirconium hydrocarbyl. More preferably, the transition metal compound is a zirconium arylalkyl. Most preferably, the transition metal compound is tetrabenzylzirconium.

Examples of useful transition metal compounds are tetramethylzirconium, tetraethylzirconium, tetrakis [trimethylsilylmethyl]zirconium, tetrakis [dimethylamino] zirconium, dichlorodibenzylzirconium, chlorotribenzylzirconium, trichlorobenzylzirconium, bis [dimethylamino]bis[benzyl]zirconium, and tetrabenzylzirconium.

Examples of useful transition metal compounds are tetramethyltitanium, tetraethyltitanium, tetrakis [trimethylsilylmethyl]-titanium, tetrakis[dimethylamino] titanium, dichlorodibenzyltitanium, chlorotribenzyltitanium, trichlorobenzyltitanium, bis [dimethylamino]bis[benzyl]titanium, and tetrabenzyltitanium.

Examples of useful transition metal compounds are tetramethylhafnium, tetraethylhafnium, tetrakis [trimethylsilylmethyl]hafnium, tetrakis[dimethylamino] hafnium, dichlorodibenzylhafnium, chlorotribenzylhafnium, trichlorobenzylhafnium, bis [dimethylamino]bis[benzyl]hafnium, and tetrabenzylhafnium.

The Transition Metal Catalyst Precursor Compound

The transition metal catalyst precursor compounds may be made by any method known in the art. For example, U.S. Ser. No. 09/103,620, now U.S. Pat. No. 6,103,657 filed Jun. 23, 1998 claiming priority from provisional application No. 60/051,581 filed Jul. 2, 1997, now published as WO 99/01460, discloses methods to produce bidentate ligand compounds that will also apply to the production of the tridentate ligand catalyst of this invention.

In its broadest description the metal catalyst precursor compounds would be represented by the following formulae:

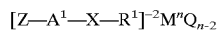
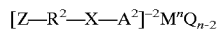

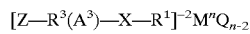
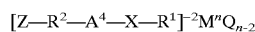

wherein:

M is a Group 3 to 12 transition metal or a Group 13 or 14 main group metal, preferably a Group 4, 5, or 6 metal, and more preferably a Group 4 metal, and most preferably zirconium, or hafnium.

n is the oxidation state of M, preferably +3, +4, or +5, and more preferably +4.

Z, $A^1$, X, $R^a$, $R^b$, and $A^2$ are as described above.

Each Q is independently a leaving group, preferably, an anionic leaving group, more preferably hydrogen, a hydrocarbyl group, a heteroatom or a halogen, and most preferably an alkyl.

Some preferred catalyst precursor compounds are given by the following formulas:

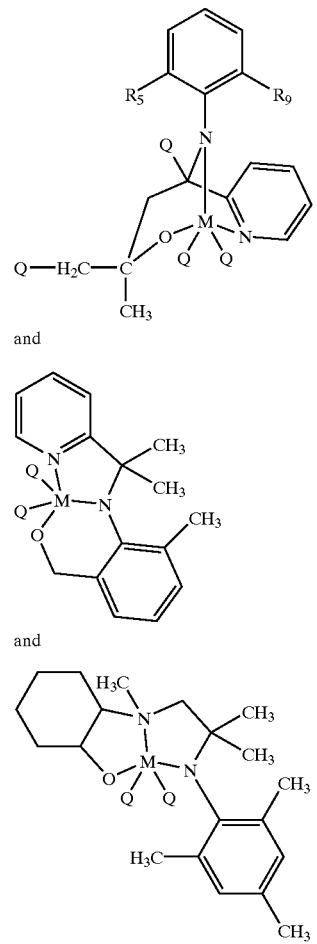

The Catalyst

In one preferred embodiment transition metal compound is used in combination with an alumoxane, preferably methylalumoxane, more preferably a modified methyl alumoxane in a gas or slurry phase reactor to produce polyethylene, preferably high density polyethylene. In another prefered embodiment a non-coordination anion, such as tri(n-butyl)ammonium tetrakis (pentafluorophenyl) boron or trisperfluorophenyl boron, is used in combination with the transition metal compound in a gas or slurry phase reactor. In another embodiment that activator is selected from the following: tris (2,2',2"-nonafluorobiphenyl)

fluoroaluminate, alumoxane, triphenyl boron, triethyl boron, tri-n-butyl ammonium tetraethylborate, triaryl borate, tri(n-butyl) ammonium tetrakis (pentafluorophenyl) boron, or a trisperfluorophenyl boron, or diethylaluminum chloride.

In another embodiment of the invention, the mole ratio of the metal of an alumoxane activator component to the transition metal of the catalyst precursor component is in the range of ratios between 0.3:1 to 1000:1, preferably 20:1 to 800:1, and most preferably 50:1 to 500:1.

In another embodiment where the activator is an ionizing activator as previously described the mole ratio of the metal of the activator component to the transition metal component is in the range of ratios between 0.3:1 to 3:1.

The catalyst system may be supported on an organic or inorganic support. Typically the support can be of any of the solid, porous supports. Typical support materials include talc; inorganic oxides such as silica, magnesium chloride, alumina, silica-alumina; polymeric supports such as polyethylene, polypropylene, polystyrene; and the like. Preferred supports include silica, clay, talc, magnesium chloride and the like. Preferably the support is used in finely divided form. Prior to use the support is preferably partially or completely dehydrated. The dehydration may be done physically by calcining or by chemically converting all or part of the active hydroxyls. For more information on how to support catalysts please see U.S. Pat. No. 4,808,561 which teaches how to support a metallocene catalyst system. The techniques used therein are generally applicable for this invention.

In a preferred embodiment the catalyst system is fed into the reactor as a solution or a slurry. Hydrocarbons are useful for the solutions or slurries. For example the solution can be toluene, hexane, isopentane or a combination thereof such as toluene and isopentane or toluene and pentane.

In another embodiment the carrier for the catalyst system or its components is a super critical fluid, such as ethane or propane. For more information on supercritical fluids as catalyst feed agents see EP 0 764 665 A2.

In another preferred embodiment the catalyst is combined with up to 6 weight % of a metal stearate, (preferably a aluminum stearate, more preferably aluminum distearate) based upon the weight of the catalyst, any support and the stearate, preferably 2 to 3 weight %. In an alternate embodiment a solution of the metal stearate is fed into the reactor. These agents may be dry tumbled with the catalyst or may be fed into the reactor in a solution with or without the catalyst system or its components. In a preferred embodiment the catalyst combined with the activators is tumbled with 1 weight % of aluminum distearate and/or 2 weight % of an antistat, such as a methoxylated amine, such as Witco's Kemamine AS-990 from ICI Specialties in Bloomington Del. The metal stearate and/or the anti-static agent may be slurried into the reactor in mineral oil, ground into a powder then suspended in mineral oil then fed into the reactor, or blown directly into the reactor as a powder.

More information on using aluminum stearate type additives may be found in U.S. Ser. No. 09/113,216 filed Jul. 10, 1998, now abandoned which is incorporated by reference herein.

Polymerization Process of the Invention

The catalysts and systems of multiple catalyst at least one of which is a catalyst of this invention described above are suitable for use in a solution, gas or slurry polymerization process or a combination thereof, most preferably a gas or slurry phase polymerization process.

In one embodiment, this invention is directed toward the solution, slurry or gas phase polymerization reactions involving the polymerization of one or more of monomers having from 2 to 30 carbon atoms, preferably 2–12 carbon atoms, and more preferably 2 to 8 carbon atoms. Preferred monomers include one or more of ethylene, propylene, butene-1, pentene-1, 4-methyl-pentene-1, hexene-1, octene-1, decene-1, 3-methyl-pentene-1, and cyclic olefins or a combination thereof. Other monomers can include vinyl monomers, diolefins such as dienes, polyenes, norbornene, norbornadiene, vinyl norbornene, ethylidene norbornene monomers. Preferably a homopolymer of ethylene is produced. In another embodiment, a copolymer of ethylene and one or more of the monomers listed above is produced.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In a particularly preferred embodiment the process of this invention relates to the polymerization of ethylene and at least one comonomer having from 4 to 8 carbon atoms, preferably 4 to 7 carbon atoms. Particularly, the comonomers are butene-1, 4-methyl-pentene-1,3-methyl-pentene-1, hexene-1 and octene-1, the most preferred being hexene-1, butene-1 and octene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C. In another embodiment when high density polyethylene is desired then the reactor temperature is typically between 70 and 105° C.

The productivity of the catalyst or catalyst system in a gas phase system is influenced by the main monomer, preferably ethylene, which is from about 25 to 90 mole percent and the comonomer partial pressure is in the range of from about 20 psia (138 kPa) to about 300 psia (517 kPa), preferably monomer partial pressure. The preferred mole percent of the main monomer, ethylene or propylene about 75 psia (517 kPa) to about 300 psia (2069 kPa), which are typical conditions in a gas phase polymerization process. Also in some systems the presence of comonomer can provide a increase in productivity.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and preferably greater than 65,000 lbs/hr (29,000 Kg/hr) to greater than 100,000 lbs/hr (45,500 Kg/hr), and most preferably over 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres (15 psi to 735 psi, 103 kPa to 5068 kPa) and even greater and temperatures in the range of 0° C. to about 120° C. In a slurry polymerization, a suspension of solid, particulate polymer is formed in a liquid polymerization diluent medium to which ethylene and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at a pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

Another process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference.

In another embodiment the process is run with scavengers. Typical scavengers include trimethyl aluminum, tri-isobutyl aluminum and an excess of alumoxane or modified alumoxane.

EXAMPLES

Preparation of Diacetyl-bis(2,6-diisopropylphenylimine) diazabutadiene

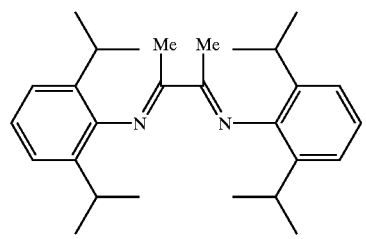

Into a 300 mL flask equipped with a stir bar was charged 100 mmol 2,6-diisopropylaniline and 100 mL methanol. The solution was chilled to 0° C. and 0.19 mL formic acid was added to the stirring solution. When the solution reached room temperature 50 mmol 2,3-butanedione was added. The solution was allowed to stir overnight, then filtered to collect the yellow solids. The crude product was dissolved in hexane and dried over Na₂SO₄. The mixture was filtered and the filtrate vacuum stripped. The solids were then recrystallized from methanol/ethanol.

Monoalkylation of diacetyl-bis(2,6-diisopropylphenylimine) diazabutadiene

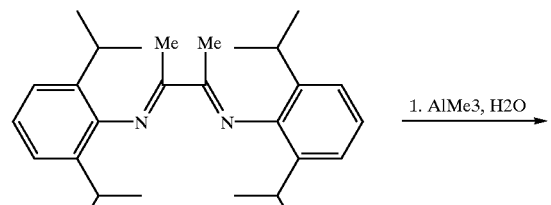

Diacetyl-bis(2,6-diisopropylphenylimine) (25 mmol, 10 g) was dissolved in 25 mL toluene in a 100 mL Schlenk flask equipped with a stir bar and septa and chilled to 0° C. Trimethyl aluminum (25 mmol (12.5 mL) Aldrich, [2.0M soln in toluene]) was charged dropwise via syringe. The reaction was allowed to slowly warm to room temperature and stir. When complete, the reaction was hydrolyzed with NaOH/H₂O and extracted with ether. The ether extracts were dried over MgSO₄ and filtered. The filtrate was vacuum stripped to a viscous orange residue.

Hydrolysis of the monoalkylated diazabutadiene to Keto-Amine

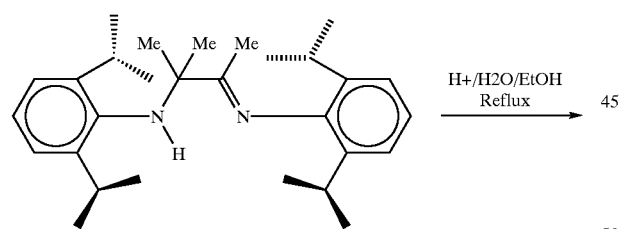

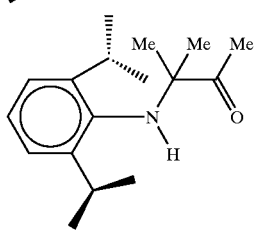

The monoalkylated diazabutadiene (150.0 mmol, 60 g) was charged a 3 L 3-neck round-bottom flask equipped with a stir bar. A 75 mL addition funnel was attached to the reaction flask. Ethanol (750 mL) was added through the addition funnel to dissolve the monoalkylated diazabutadiene. When completed dissolved, 250 mL water was added. Sulfuric acid (600 mmol, 600 mL of 1.0M soln in H2O) was charged to the addition funnel. The H₂SO₄ was added over a 1 hour period. A reflux condenser was attached to the reaction flask and the reaction was heated to 85 C. and allowed to reflux for 1 hour.

When the reaction was complete the reaction solution was transferred into 4 L beaker equipped with a stir bar. Sodium hydroxide pellets were slowly added to the stirring solution until pH reached 9.0. The solution was extracted with toluene. The extracts were dried over MgSO₄, filtered and the filtrate vacuum stripped to a viscous yellow residue, then vacuum distilled with a shortpath distillation apparatus.

Tridentate NNO Ligand Preparation

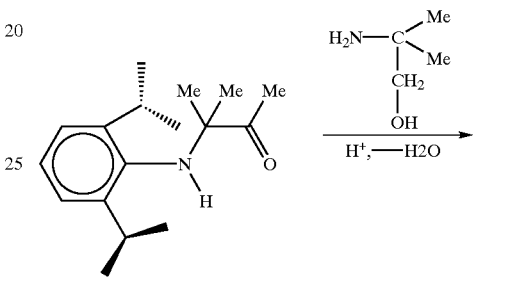

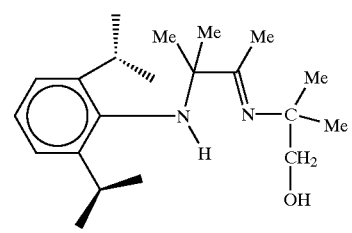

Keto-Amine (3.8 mmol, 1.0 g, [261.40]) and 5.0 mL ether were charged to a 25 mL Schlenk flask equipped with a stir bar and septa. Hydrochloric acid (0.2 mmol, 0.2 mL 1.0M in ether) was added via syringe. 2-amino-2-methyl-1-propanol (200 mmol, 18 mL, Acros, [89.14]) was added to the stirring Keto-Amine solution. A Dean-Stark apparatus with a dry ice condenser was attached to the reaction flask. The reaction flask was heated to 60° C. to remove the ether. When all ether was removed the temperature was increased to 155° C. for 5 hours. GC analysis indicated 76% possible product. The reaction was allowed to stir at room temperature overnight. The Dean-Stark apparatus was replaced with a shortpath distillation apparatus and the reaction was distilled to remove the excess alcohol. The tacky brown residue was hydrolyzed with NaOH/H₂O and extracted 3 times with 50 mL toluene. The extracts were dried under vacuum to tan solids.

Tridentate NNO Zirconium Complex Preparation:.

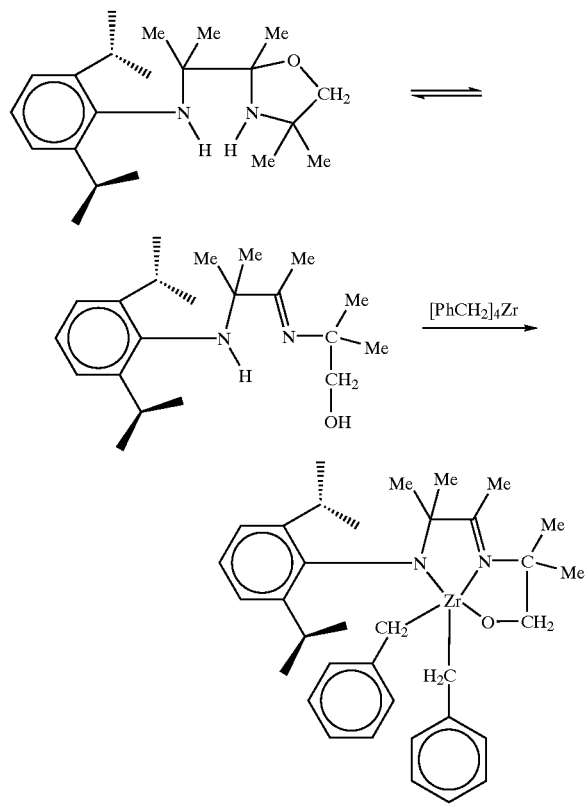

Tetrabenzyl zirconium (0.200 mmol, 0.091 g, Boulder Scientific, BSC-570-02-0100, [455.75]) was charged to a 7 mL amber bottle equipped with a stir bar and screw cap. The ligand (0.200 mmol. 0.066 g, [332.52]) was charged to a second vial. Benzene-$d_6$ (1.5 mL) was added to both vessels and stirred to dissolve. The ligand solution was transferred into the stirring Zirconium solution. The bottle was capped and the solution was allowed to stir at room temperature in the dry box for 18 hours.

Ethylene Polymerization

The tridentate NNO zirconium complex preparation (10 μmoles) was added to 0.10 mLs of 1-hexene. Modified methyl aluminoxane (MMAO) type 3A in heptane (5.0 mmloes), was added to the zirconium complex/1-hexene solution to make a reaction solution. 1-hexene (43 mLs) was charged to a 1 L stainless steel reactor containing 600 mLs of n-hexane. MMAO (5.0 mmloes) was also added to the reactor. The reaction solution was charged to the reactor 15 minutes after mixing. The polymerization reaction occurred under 85 psi ethylene partial pressure and 85° C. After drying, 1.7 grams of ethylene/hexene resin was recovered.

As is apparent form the foregoing general description and the specific embodiments, while forms of the invention have been illustrated and described, various modifications can be made without departing from the spirit and scope of the invention. Accordingly it is not intended that the invention be limited thereby.

I claim:

1. A polymerization catalyst comprising a combination of at least one activator and a reaction product eta transition metal compound with a tridentate ligand generating composition represented by a formula of;

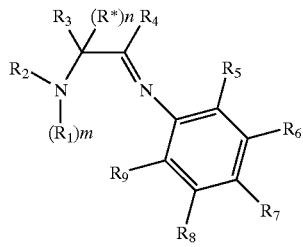

or

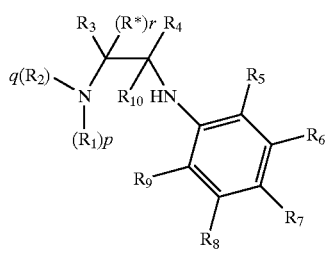

wherein: $R_2$ and $R_3$ are hydrocarbyl radicals or substituted hydrocarbyl radicals, $R_5$–$R_8$ are each, independently, hydrogen, a hydrocarbyl radical or a substituted hydrocarbyl radical; one of $R_1$, $R_2$, $R_3$, $R_4$, or $R_9$ is a radical that contains a Group 16 atom and R* is a hydrocarbyl radical or substituted hydrocarbyl radical when $R_1$ is a radical that contains a Group 16 atom, otherwise $R_1$, $R_2$, $R_3$, $R_4$, $R_9$ and R* are each, independently, hydrogen, a hydrocarbyl radical or a substituted hydrocarbyl radical; and for formula (I) m and n are values of 0 or 1, and when m is 0 and n is 0 $R_2$ and $R_3$ may be joined together to form an aromatic ring structure, and when n is 0 and m is 1 $R_2$ and $R_3$ may be joined together to form ring structures; any two adjacent groups of $R_5$ to $R_9$ may be joined together to form ring structures; for formula (II) $R_1$ through $R_9$ and R* are as explained above and $R_{10}$ is hydrogen, a hydrocarbyl radical or a substituted hydrocarbyl radical; and p, q and r are values of 0 or 1 wherein p is 0 only when q is 1 and r is 0; wherein the radical that contains a Group 16 atom is a ketone.

2. The polymerization catalyst of claim 1 wherein the transition metal compound is of a Group 4 metal.

3. The polymerization catalyst of claim 2 wherein the transition metal is Zr.

4. The polymerization catalyst of claim 1 wherein the radical that contains the Group 16 atom, when bonded to the transition metal, forms a ring of 5 to 8 atoms.

5. The polymerization catalyst of claim 1 wherein the radical that contains the Group 16 atom, when bonded to the transition metal, forms a ring of 5 to 7 atoms.

6. The polymerization catalyst of claim 1 wherein the radical that contains the Group 16 atom, when bonded to the transition metal, forms a ring of 6 atoms.

7. A polymerization catalyst comprising a combination of at least one activator and a reaction product of a transition metal compound with a tridentate ligand generating composition represented by a formula of:

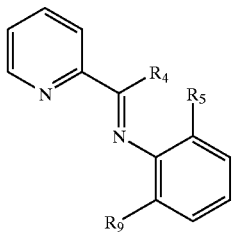

wherein, wherein $R_4$ is a radical that contains an oxygen based functional group selected from an alcohol, an aldehyde, a ketone, or an epoxide and $R_5$ and $R_9$ are alkyl radicals.

8. A polymerization catalyst comprising a combination of at least one activator and a reaction product of a transition metal compound with a tridentate ligand generating composition represented by a formula of:

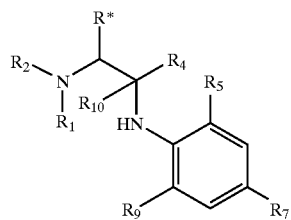

wherein $R_1$ is a radical that contains an oxygen based functional group selected from an alcohol, an aldehyde, a ketone, an epoxide and $R^*$, $R_2$, $R_4$, $R_5$, $R_7$, $R_9$, and $R_{10}$ are hydrocarbyl radicals.

9. A polymerization catalyst comprising a combination of at least one activator and a reaction product of a transition metal compound with a tridentate ligand generating composition represented by a formula of:

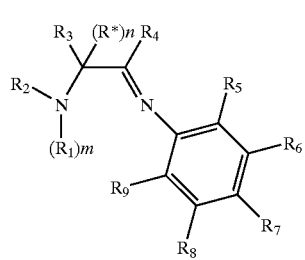

(I)

or

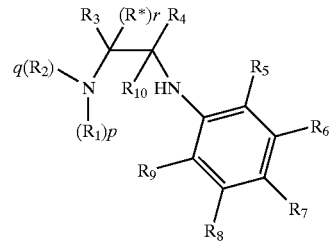

(II)

wherein: $R_2$ and $R_3$ are hydrocarbyl radicals or substituted hydrocarbyl radicals, $R_5$–$R_8$ are each, independently, hydrogen, a hydrocarbyl radical or a substituted hydrocarbyl radical; one of $R_1$, $R_2$, $R_3$, $R_4$, or $R_9$ is a radical that contains a Group 16 atom and $R^*$ is a hydrocarbyl radical or substituted hydrocarbyl radical when $R_1$ is a radical that contains a Group 16 atom, otherwise $R_1$, $R_2$, $R_3$, $R_4$, $R_9$ and $R^*$ are each, independently, hydrogen, a hydrocarbyl radical or a substituted hydrocarbyl radical; and for formula (I) m and n are values of 0 or 1, and when m is 0 and n is 0 $R_2$ and $R_3$ may be joined together to form an aromatic ring structure, and when n is 0 and m is 1 $R_2$ and $R_3$ may be joined together to form ring structures; any two adjacent groups of $R_5$ to $R_9$ may be joined together to form ring structures; for formula (II) $R_1$ through $R_9$ and $R^*$ are as explained above and $R_{10}$ is hydrogen, a hydrocarbyl radical or a substituted hydrocarbyl radical; and p, q and r are values of 0 or 1 wherein p is 0 only when q is 1 and r is 0; wherein the a Group 16 atom is a sulfur based functional group.

10. The polymerization catalyst of any one of claim 7, 8, or 9, wherein the transition metal compound is of a Group 4 metal.

11. The polymerization catalyst of any one of claim 7, 8, or 9, wherein the transition metal is Zr.

12. The polymerization catalyst of any one of claim 1, 7, 8, or 9, further comprising an organic or inorganic support.

* * * * *